(12) United States Patent
Blake et al.

(10) Patent No.: US 10,339,064 B2
(45) Date of Patent: Jul. 2, 2019

(54) HOT CACHE LINE ARBITRATION

(71) Applicant: International Business Machines Corporation, Armonk, NY (US)

(72) Inventors: Michael A. Blake, Wappingers Falls, NY (US); Timothy C. Bronson, Round Rock, TX (US); Jason D. Kohl, Austin, TX (US); Pak-Kin Mak, Poughkeepsie, NY (US); Vesselina K. Papazova, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 15/472,610

(22) Filed: Mar. 29, 2017

(65) Prior Publication Data
US 2018/0285277 A1   Oct. 4, 2018

(51) Int. Cl.
*G06F 13/18* (2006.01)
*G06F 12/0877* (2016.01)

(52) U.S. Cl.
CPC .......... *G06F 12/0877* (2013.01); *G06F 13/18* (2013.01); *G06F 2212/1016* (2013.01); *G06F 2212/502* (2013.01)

(58) Field of Classification Search
None
See application file for complete search history.

(56) References Cited

U.S. PATENT DOCUMENTS

| | | | |
|---|---|---|---|
| 7,325,101 B1 | 1/2008 | Lacobovici et al. | |
| 7,523,260 B2 * | 4/2009 | Arimilli | G06F 9/526 711/124 |
| 7,853,755 B1 | 12/2010 | Agarwal et al. | |
| 8,762,651 B2 | 6/2014 | Blake et al. | |
| 2003/0236817 A1 | 12/2003 | Radovic et al. | |
| 2004/0230750 A1 | 11/2004 | Blake et al. | |
| 2006/0117147 A1 * | 6/2006 | Blinick | G06F 12/0831 711/145 |
| 2006/0143390 A1 | 6/2006 | Kottapalli | |
| 2008/0134185 A1 | 6/2008 | Fedorova | |
| 2008/0140942 A1 * | 6/2008 | Kornegay | G06F 12/0831 711/146 |
| 2008/0172531 A1 * | 7/2008 | Liu | G06F 12/0862 711/135 |
| 2012/0159073 A1 * | 6/2012 | Jaleel | G06F 12/0813 711/122 |
| 2018/0081814 A1 * | 3/2018 | Gellerich | G06F 12/0862 |

OTHER PUBLICATIONS

David Tam, et al.,"Thread Clustering: Sharing-Aware Scheduling on SMP-CMP-SMT Multiprocessors," EuroSys, ACM, Mar. 21-23, 2007, p. 1-12.

* cited by examiner

*Primary Examiner* — Brian R Peugh
(74) *Attorney, Agent, or Firm* — Cantor Colburn LLP; William Kinnaman (57) ABSTRACT

Embodiments of the present invention are directed to hot cache line arbitration. An example of a computer-implemented method for hot cache line arbitration includes detecting, by a processing device, a hot cache line scenario. The computer-implemented method further includes tracking, by the processing device, hot cache line requests from requesters to determine subsequent satisfaction of the requests. The computer-implemented method further includes facilitating, by the processing device, servicing of the requests according to hierarchy of the requestors.

20 Claims, 5 Drawing Sheets

HOT CACHE LINE ARBITRATION

BACKGROUND

The present invention generally relates to computer system design, and more specifically, to hot cache line arbitration.

Symmetric multiprocessing (SMP) systems utilize a multiprocessor hardware and software architecture. Two or more processors are connected to a single, shared main memory. For example, an SMP system can have a centralized shared memory that operates using a single operating system with two or more processors. Each processor can utilize its own cache memory (or simply "cache") to speed up data access to the shared memory and to reduce the system bus traffic. Some SMP systems can utilize multiple cache memories and/or multiple levels of cache memory that may be shared between and among various processors.

SUMMARY

Embodiments of the present invention are directed to a computer-implemented method for hot cache line arbitration. A non-limiting example of the computer-implemented method includes detecting, by a processing device, a hot cache line scenario. The computer-implemented method further includes tracking, by the processing device, hot cache line requests from requesters to determine subsequent satisfaction of the requests. The computer-implemented method further includes facilitating, by the processing device, servicing of the requests according to a hierarchy of the requestors.

Embodiments of the present invention are also directed to a system for hot cache line arbitration. Additional embodiments of the present invention are directed to a computer program product for hot cache line arbitration.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
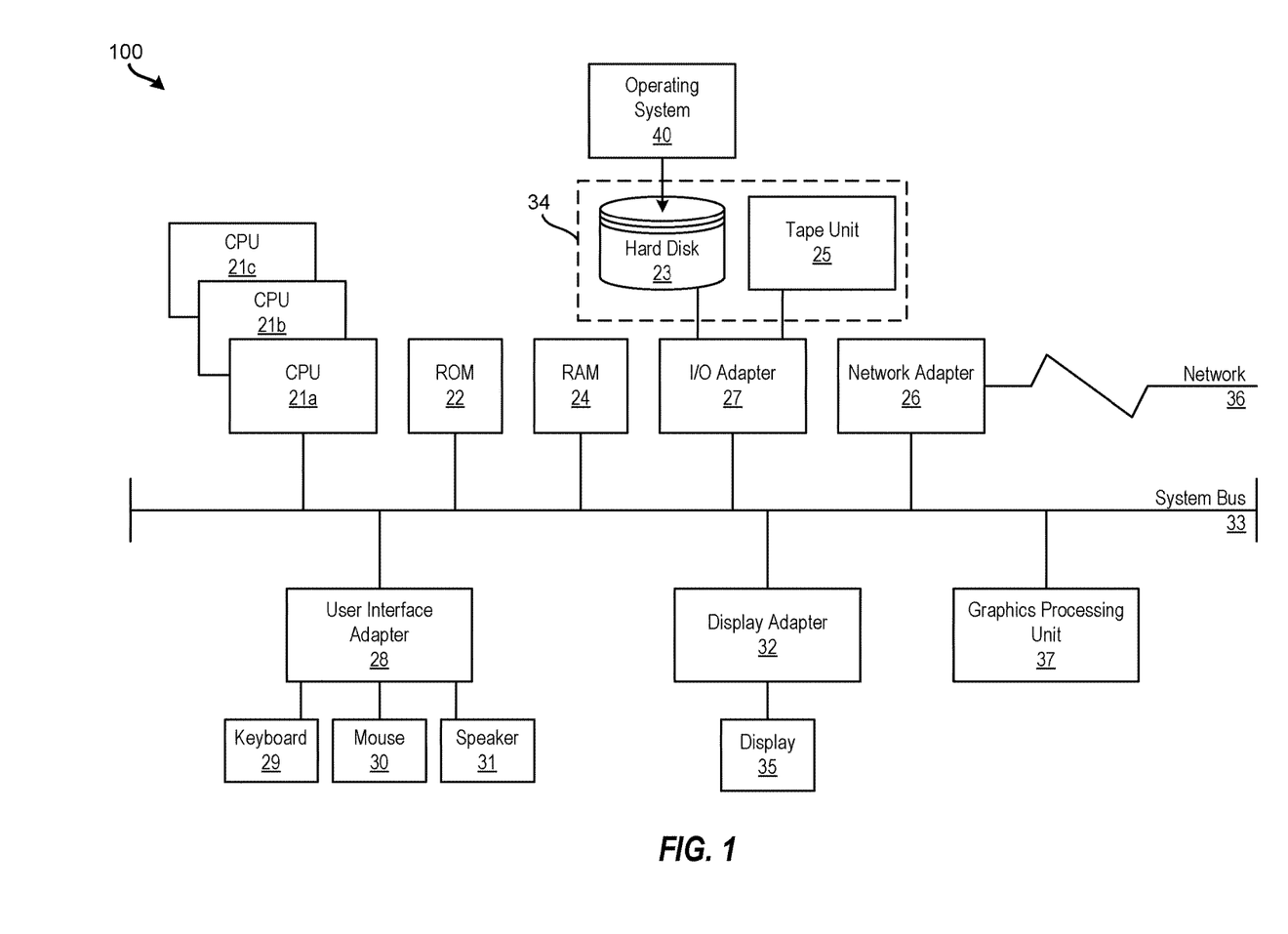
FIG. 1 depicts a processing system for implementing the techniques described herein according to embodiments of the present invention.

It is understood that embodiments of the present invention are capable of being implemented in conjunction with any other suitable type of computing environment now known or later developed. For example, FIG. 1 depicts a block diagram of a processing system 100 for implementing the techniques described herein. In examples, processing system 100 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 100.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 100 may be stored in mass storage 34. A network adapter 26 interconnects system bus 33 with an outside network 36 enabling processing system 100 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in the processing system 100.

Turning now to an overview of technologies that are more specifically relevant to aspects of the invention, highly distributed, large symmetric multiprocessing (SMP) systems utilize decentralized cache line access arbitration. It such systems, it is describable to favor remote requestors (i.e., requests from other instances of the same cache hierarchy) over local requestors for non-contested cache lines. Generally, a well-organized SMP system has more local requests than remote requests. If the cache line arbitration were biased for local requests first, then the local processors can enter a fetch loop that can create a system wide starvation where remote processors can take a very long time before having access to a cache line. In such cases, the remote requestors can time out before accessing the cache line.

An arbitration scheme that imposes order locally over all requestors, local and remote, is problematic when there are many requestors competing for multiple shared resources. For example, highly contested cache lines (also referred to as "hot cache lines"), which can contain a semaphore or lock, are requested by many processors throughout an SMP system. The traditional favoring of remote requestors over local requestors results in the excessive transmittal of hot cache lines between the highest levels of hierarchy. An ordered queue of requestors would likewise result in the excessive transmittal of hot cache lines to remote requestors.

As SMP systems grow, transmission latency between the highest levels of cache increases, especially relative to the increased local processing capacity. For example, when the SMP system reaches a size with hundreds of processors, and the cache line transit time between groups of processors can take hundreds to thousands of cycles, excess movement of a cache line (containing a semaphore/lock) between groups of processors can result in more time spent in transit than in actual use of the semaphore/lock. This causes an adverse effect on system responsiveness. For example, applications that synchronize otherwise parallel tasks by way of a lock can suffer significant delay.

Turning now to an overview of the aspects of the invention, one or more embodiments of the invention address the above-described shortcomings of the prior art by providing hot cache line arbitration by detecting hot cache line scenarios, tracking (or "scoreboarding") hot cache line requests to track subsequent satisfaction of the requests, and servicing the requests according to hierarchy. For example, hot cache line requests are serviced for requestors within a first requesting cluster, hot cache line requests are next serviced for requestors within a second requesting cluster, and then hot cache line requests from remote drawers are allowed to remove the hot cache line from the drawer before local requestors from either the first cluster or the second cluster can access the hot cache line a second time.

The embodiments of the present invention detect a hot line cache scenario and allow each of the local requestors (e.g., CMP chips in two clusters on a drawer) to acquire exclusive access to the semaphore/lock address one time each before allowing a remote requestor (e.g., a requestor from another drawer) to remove the line from the drawer. Additionally, each requestor within a given cluster of CMP's acquires exclusive access to the semaphore/lock address one time each before requestors in the other cluster are allowed to access the semaphore/lock address. In other words, requests are serviced one cluster at a time.

The above-described aspects of the invention address the shortcomings of the prior art by improving lock efficiency by reducing drawer-to-drawer and cluster-to-cluster transfers of hot cache lines. This increases the time spent processing a locked resource relative to the transit time of the lock between requestors at various hierarchical levels within clusters/drawers of a drawer-based SMP system.

Figure 2:
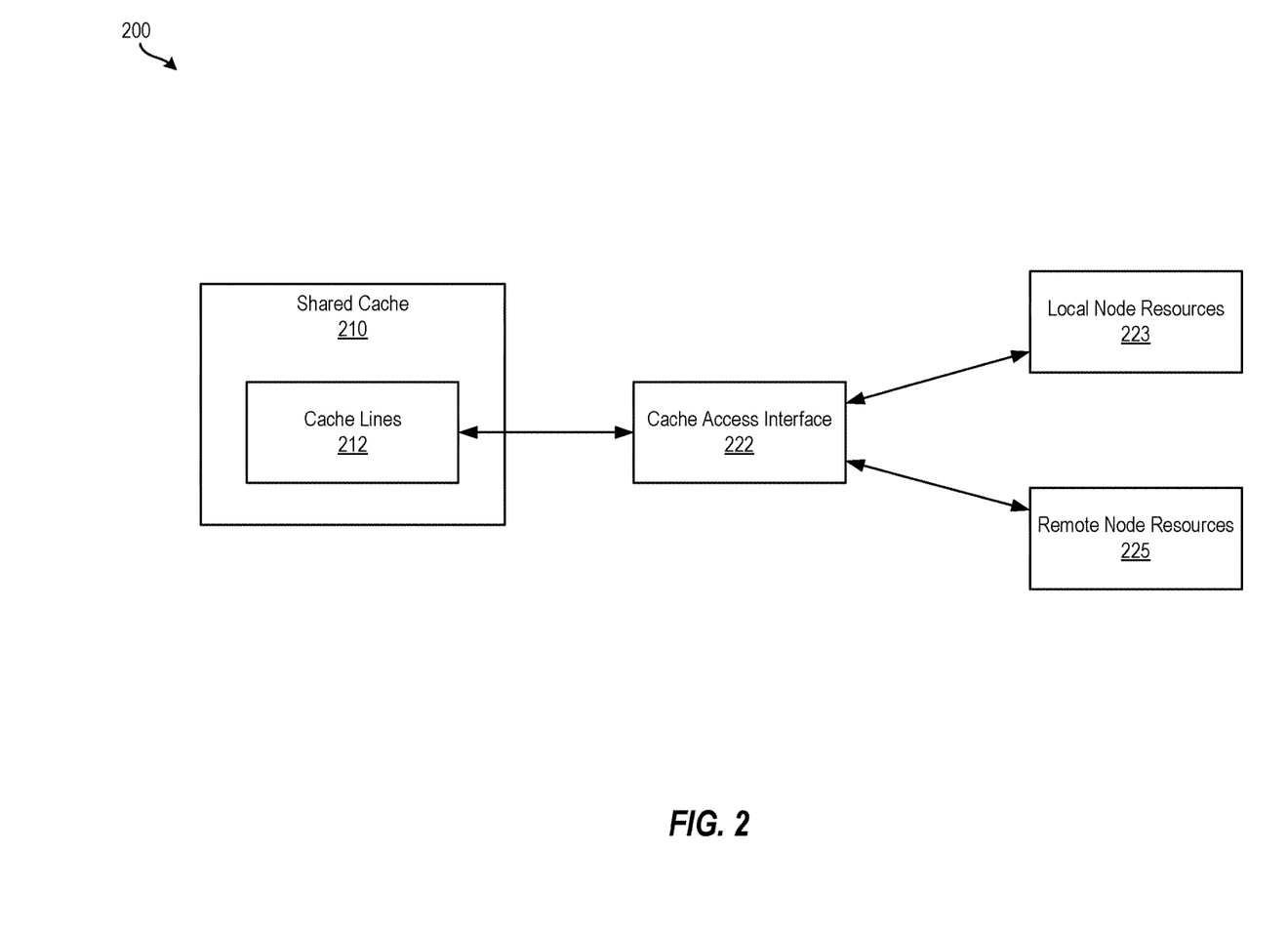
FIG. 2 depicts a node of a multi-node processing system according to embodiments of the present invention.

Turning now to a more detailed description of aspects of the present invention, FIG. 2 depicts a node 200 of a multi-node processing system according to embodiments of the invention. The node 200 can be a portion of a symmetric multiprocessing (SMP) system, for example, or another suitable type of processing system.

The node 200 includes a shared cache 210 that is shared by local node resources 223 and remote node resources 225 configured and arranged as shown. The local node resources 223 access cache lines 212 in the shared cache 210 via a cache access interface 222. Similarly, the remote node resources 225 access cache lines 212 via the cache access interface 222.

Figure 3:
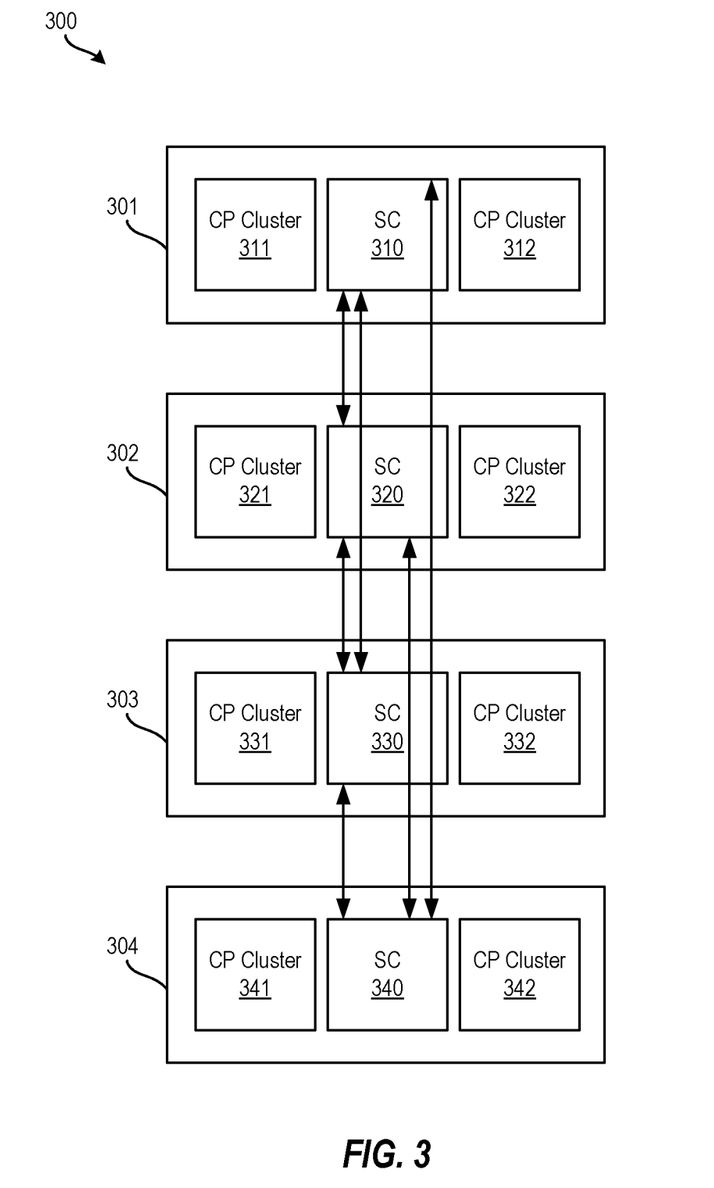
FIG. 3 depicts a multi-node processing system according to embodiments of the present invention.

FIG. 3 depicts a multi-node processing system 300 including a plurality of interconnected drawers 301, 302, 303, 304 according to embodiments of the present invention. Each of the drawers 301-304 include two central processor (CP) clusters and a shared cache (SC) chip configured and arranged as shown. For example, the drawer 301 includes a CP cluster 311, a CP cluster 312, and an SC 310; the drawer 302 includes a CP cluster 321, a CP cluster 322, and an SC 320; the drawer 302 includes a CP cluster 331, a CP cluster 332, and an SC 330; and the drawer 304 includes a CP cluster 341, a CP cluster 342, and an SC 340.

As shown in FIG. 3, each of the SC chips 310, 320, 330, 340 are fully interconnected. That is, SC 310 is communicatively connected directly to SC 320, 330, 340; SC 320 is communicatively connected directly to SC 310, 330, 340; SC 330 is communicatively connected directly to SC 310, 320, 340; and SC 340 is communicatively connected directly to SC 310, 320, 330. Each SC 310, 320, 330, 340 is also communicatively connected to its respective CP clusters (e.g., the SC 310 is communicatively connected to the CP cluster 311 and the CP cluster 312, the SC 320 is communicatively connected to the CP cluster 321 and the CP cluster 322, etc.). Additionally, each SC 310, 320, 330, 340 includes an L4 cache (not shown).

Figure 4:
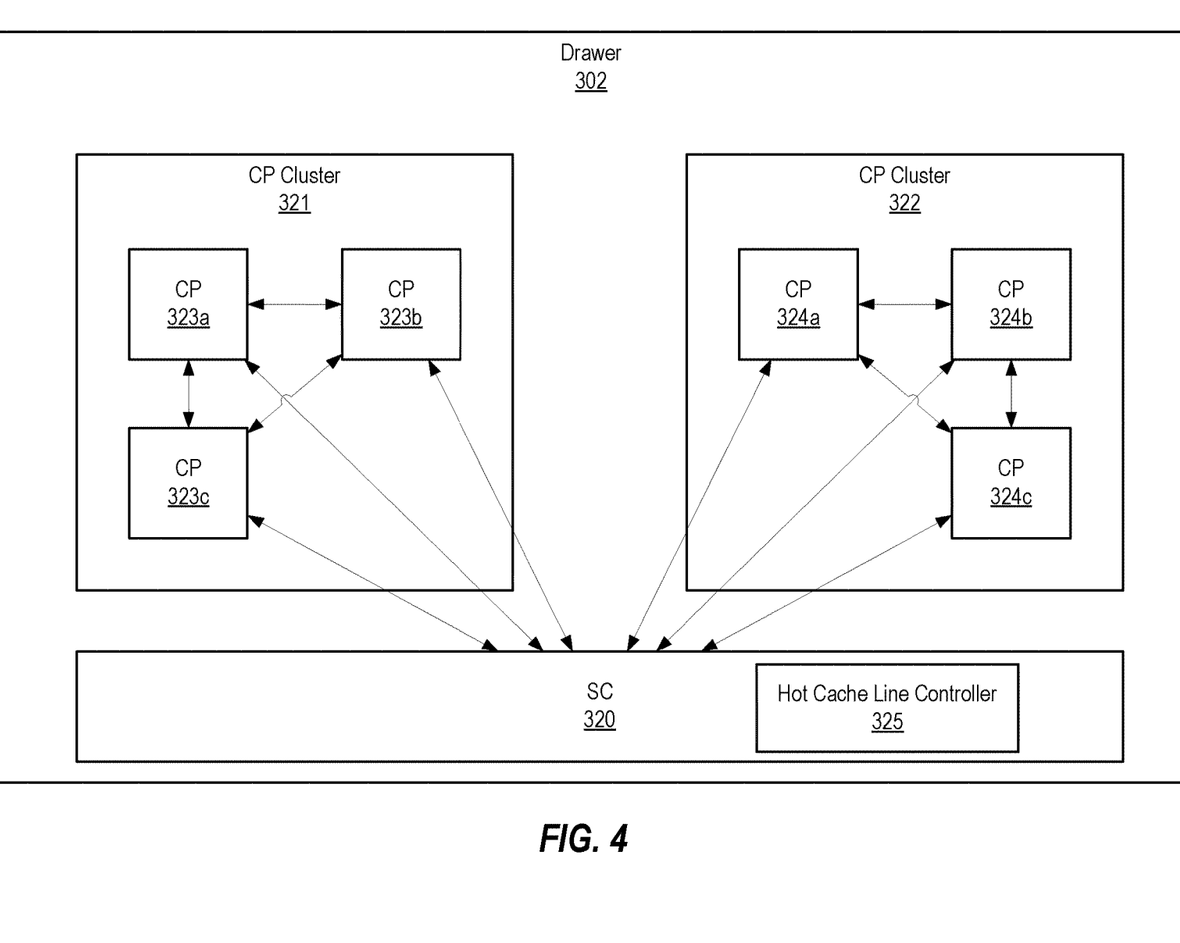
FIG. 4 depicts a drawer of the multi-node processing system of FIG. 3 according to embodiments of the present invention.

FIG. 4 depicts a drawer 302 of the multi-node processing system 300 of FIG. 3 according to embodiments of the present invention. The drawer 302 includes two CP clusters (e.g., CP cluster 321 and CP cluster 322). Each CP cluster contains individual CP chips. For example, CP cluster 321 contains CP chips 323a, 323b, 323c; and CP cluster 322 contains CP chips 324a, 324b, 324c. Each of the individual CP chips (e.g., CP chips 323a, 323b, 323c, 324a, 324b, 324c) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP 323a includes multiple processing cores that each has its own L1/L2 cache, and the multiple processing cores within the CP 323a share an L3 cache.

The SC 320 contains an L4 cache and interconnects for communication with each CP chip (e.g., CP chips 323a, 323b, 323c, 324a, 324b, 324c) in both clusters 321, 322 on the drawer 303 and for communication with other share cache chips on other drawers (e.g., the SC 310 of the drawer 301, the SC 330 of the drawer 303, the SC 340 of the drawer 304, etc.).

When the SC 320 receives a fetch with intent to modify (FWITM) from a CP (e.g., CP 323a, etc.) in the cluster (e.g., the CP cluster 321), and the target cache line is not held exclusive by any of the CP's in the CP cluster 321, the request activates hot cache line arbitration for that cluster. A hot cache line controller 325 in the SC 320 employs a "scoreboard" to track and satisfy other requests for the same cache line originating in the same cluster.

Processing is different for the first cluster on a drawer to initiate an FWITM request. The hot cache line controller 325 establishes the cache line as exclusive to the cluster and drawer (versus the second cluster on the drawer or a cluster on another drawer). Sequencing for the first cluster allows all requestors in that cluster (e.g., the CP cluster 321) to be satisfied once, then causes requests from the other cluster (e.g., the CP cluster 323) to be favored over remote requests (e.g., requests from clusters on other drawers). This enables requests from the second cluster to be satisfied before the line is moved off-drawer by a remote request. Sequencing for the second cluster (e.g., the CP cluster 324) enables all requestors (e.g., CP 324a, 324b, 324c) in that cluster to be satisfied once, then causes requests from remote requestors to be favored over requests from either cluster, so that remote requestors can remove the cache line from the drawer 302 after all the requestors in the second (and first) clusters (e.g., the CP clusters 321, 322) have been satisfied.

First requesting cluster processing is now described. As used to describe an embodiment of the present invention, the "first cluster" refers to CP cluster 321 and the "second cluster" refers to CP cluster 322. In this examples, requests from the second cluster (e.g, CP cluster 322) are favored over requests from off-drawer requestors (e.g., requesters in drawers 301, 303, 304, etc.) once all the requestors from the first cluster (e.g., CP cluster 311) are satisfied.

A hot cache line fairness mechanism is activated to moderate or "scoreboard" subsequent requests for the same line from other CP's (e.g., CPs 323a, 323b, 323c) in the requesting cluster (e.g., CP cluster 321). Special "pending" signals are asserted by the hot cache line controller 325 to control the SC response and arbitration for subsequent requests to the same cache line.

The hot cache line controller 325 asserts local_snoop_reject_pend for the first cluster (e.g., CP cluster 321). This causes the SC 320 to reject requests for the same line from CP chips in the first cluster for subsequent retry by the CPs in the first cluster. The hot cache line controller 325 then asserts local_snoop_load_but_suspend for the second cluster (e.g., the CP cluster 322), which enables a request for the same cache line from a CP in the second cluster 322 to be loaded into the SC 320, but the request is immediately suspended and remains so until the hot line fairness mechanism de-asserts the local_snoop_load_but_suspend signal for the second cluster. Any such suspended operation loaded into the SC 320 sets its own local_snoop_reject_pend for the second cluster, which causes the SC 320 to reject additional requests for the same cache line from other CP chips in the second cluster. In other words, only one request from one CP in the second cluster (e.g., CP cluster 322) is loaded and immediately suspended, subsequent requests from CP cluster 322 are rejected by the SC 320.

The hot cache line controller 325 sets remote_snoop_reject_pend when processing has proceeded sufficiently to determine that the FWITM originating on the drawer 302 will not be required to wait for other accesses to the same cache line that originated on other drawers (e.g., the drawers 301, 303, 304). This causes the SC 320 to reject any access requests originating from other drawers, thereby favoring requests from the second cluster (e.g., CP cluster 322) relative to off-drawer requests for the same cache line, once the requests from the first cluster (e.g., CP cluster 321) are satisfied.

During the fetch and delivery of the cache line to the original requestor, any requests from other CP's in the first cluster are rejected back to the requestor, but the request is noted on a scoreboard in the hot cache line controller 325 so that the requests can be tracked. If no requests to the same cache line were presented and rejected during the completion of the original request, as indicated by the scoreboard in the hot cache line controller 325, the hot cache line controller 325 drops all active pending signals, resets the scoreboard, and becomes available to moderate or scoreboard for other cache lines that may be "hot."

Once the original request is complete (i.e., once data is delivered to the requestor and all shared copies of the cache line, if any, have been invalidated), the hot cache line controller 325 drops local_snoop_reject_pend for the first cluster (e.g., CP cluster 321). This ends the rejecting of requests from CP's in the first cluster and allows them to be completed. These subsequent requests are satisfied with intervention data from a CP in the first cluster, which is completed with minimal transit time relative to off-drawer requests or even intervention data from the other cluster. As requests are satisfied, the requestors are noted and compared against the scoreboard of requests that were rejected during the completion of the original request. Once all of the previously rejected requests have been serviced, the hot cache line controller 325 drops all active pending signals, resets it tracking vectors, and becomes available to moderate or scoreboard for other lines that may be "hot." To do this, the hot cache line controller 325 drops local_snoop_load_but_suspend for the second cluster (e.g., CP cluster 322) just before it drops remote_snoop_reject_pend. If a request from the second cluster has loaded and suspended, this transition allows the second cluster request to activate hot cache line fairness again begin second requesting cluster processing ahead of any off-drawer requests.

Second requesting cluster processing is now described. In this case, requests from off-drawer requestors are favored over new requests from the first cluster, once all the requestors from the second cluster have been satisfied. First, a hot cache line fairness mechanism is activated to moderate or "scoreboard" subsequent requests for the same line from other CP's (e.g., CPs 323a, 323b, 323c) in the requesting cluster (e.g., CP cluster 322). Special "pending" signals are asserted by the hot cache line controller 325 to control the SC response and arbitration for subsequent requests to the same line.

The hot cache line controller 325 asserts local_snoop_reject_pend for the second cluster (e.g., CP cluster 322). This causes the SC 320 to reject requests for the same line from CP chips in the second cluster for subsequent retry by the CPs in the second cluster. The hot cache line controller 325 then asserts local_snoop_load_but_suspend for the first cluster (e.g., the CP cluster 321), which enables a request for the same cache line from a CP in the first cluster 321 to be loaded into the SC 320, but the request is immediately suspended and remains so until the hot line fairness mechanism de-asserts the local_snoop_load_but_suspend signal for the second cluster. Any such suspended operation loaded into the SC 320 sets its own local_snoop_reject_pend for the first cluster, which causes the SC 320 to reject additional requests for the same cache line from other CP chips in the first cluster. In other words, only one request from one CP in the first cluster (e.g., CP cluster 321) is loaded and immediately suspended, subsequent requests from CP cluster 321 are rejected by the SC 320.

The hot cache line controller 325 then sets remote_snoop_load_but_suspend to enable a request from a remote drawer (e.g., drawer 301, 303, 304, etc.) for the same cache line to be loaded into the SC 320, but the request is immediately suspended and remains so until the hot cache line controller 325 de-asserts the remote_snoop_load_but_suspend signal. Any such suspended remote operation loaded into the SC 320 sets its own local_snoop_reject_pend for the second cluster, which prevents any suspended operations from the second cluster from activating the hot cache line controller 325 and causes the SC 320 to reject additional requests for the same cache line from other CP chips in the first cluster. The suspended remote request will be allowed to move the line from the drawer 302 ahead of any new requests from the first cluster, once all the requestors from the second cluster have been satisfied.

During the fetch and delivery of the cache line to the original requestor in the second CP cluster 322, any requests from other CP's in the second cluster are rejected back to the requestor, but the request is noted on a scoreboard in the hot cache line controller 325 so that the requests can be tracked.

Once the original request is complete (i.e., once data is delivered to the requestor and all shared copies of the cache line, if any, have been invalidated), the hot cache line controller 325 drops local_snoop_reject_pend for the second cluster (e.g., CP cluster 322). This ends the rejecting of requests from CP's in the second cluster and allows them to be completed. These subsequent requests are satisfied with intervention data from a CP in the second cluster, which is completed with minimal transit time relative to off-drawer requests or even intervention data from the other cluster. As requests are satisfied, the requestors are noted and compared against the scoreboard of requests that were rejected during the completion of the original request. Once all of the previously rejected requests have been serviced, the hot cache line controller 325 drops all active pending signals, resets it tracking vectors, and becomes available to moderate or scoreboard for other lines that may be "hot."

The hot cache line controller 325 drops the remote_snoop_load_but_suspend just before the local_snoop_load_but_suspend is dropped. If a request from a remote drawer (e.g., drawer 301, 303, 304, etc.) has loaded and suspended, this transition allows the remote request to prevent any suspended requests from the first cluster (e.g., CP cluster 321) or subsequent requests from either cluster from activating the hot cache line controller 325 until the remote requestor has transferred the line to a remote drawer. That is, the remote request is now favored over local requests because all requestors from both clusters have been allowed to acquire the contested line at least once.

Figure 5:
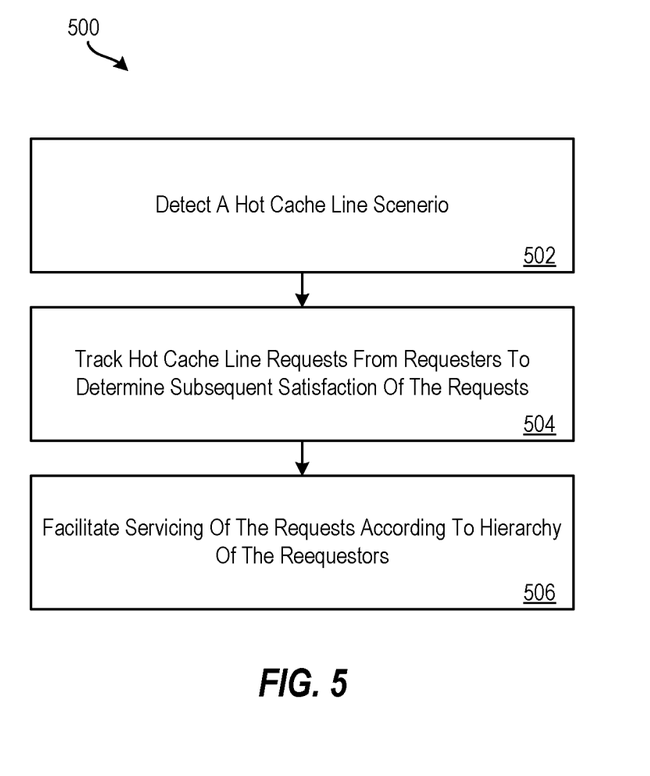
FIG. 5 depicts a flow diagram of a method for hot cache line arbitration according to examples of the present disclosure.

FIG. 5 depicts a flow diagram of a method 500 for hot cache line arbitration according to examples of the present disclosure. The method 500 can be implemented on a suitable processing system, such as the processing system 100, the multi-node processing system 200, the multi-node processing system 300, or another suitable processing system.

With reference to FIG. 4, the method 500 can occur as follows. At block 502, the hot cache line controller 325 detects a hot cache line scenario. A hot cache line scenario is detected when a fetch with intent to modify (FWITM) is received from a requestor (e.g., one of CP 323a, 323b, 323c) in a cluster (e.g., CP 321) and a target cache line is not held exclusive by any processor (e.g., one of CP 323a, 323b, 323c) in the cluster.

At block 504, the hot cache line controller 325 tracks (i.e., scoreboards) hot cache line requests from requesters to determine subsequent satisfaction of the requests. The requesters can be local requestors and/or remote requestors.

At block 506, the hot cache line controller 325 facilitates servicing of the requests according to the hierarchy of the requesters. For example, a request of a local requestor is serviced before a request of a remote requestor is serviced. In another example, a request of every local requestor is serviced before a request of any remote requestor is serviced.

In yet another example, facilitating servicing of the requests includes facilitating servicing a request from a requester within a first requesting cluster (e.g., CP cluster 321) of a first drawer before servicing a request from a requester within a second requesting cluster (e.g., CP cluster 322) of the first drawer. Additionally, facilitating servicing of the requests includes facilitating servicing a request from the requester within the second cluster (e.g., CP cluster 322) of the first drawer (e.g., drawer 302) prior to servicing a request from a requester in a second drawer (e.g., one of the drawers 301, 303, 304).

Additional processes also may be included, and it should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for hot cache line arbitration, the method comprising:
    detecting, by a processing device, a hot cache line scenario;
    tracking, by the processing device, hot cache line requests from requesters to determine subsequent satisfaction of the requests; and
    facilitating, by the processing device, servicing of the hot cache line requests according to a hierarchy of the requestors, the hierarchy of the requestors being based at least in part on a location of the requestors relative to one another.

2. The computer-implemented method of claim 1, wherein each of the requesters is one of a local requestor or a remote requestor.

3. The computer-implemented method of claim 2, wherein facilitating servicing of the hot cache line requests comprises facilitating servicing a request of a local requestor before servicing a request of a remote requestor.

4. The computer-implemented method of claim 3, wherein facilitating servicing of the hot cache line requests comprises facilitating servicing a request of every local requestor before servicing a request of any remote requestor.

5. The computer-implemented method of claim 1, wherein facilitating servicing of the hot cache line requests comprises facilitating servicing a request from a requester within a first requesting cluster of a first drawer before servicing a request from a requester within a second requesting cluster of the first drawer.

6. The computer-implemented method of claim 5, wherein facilitating servicing of the hot cache line requests comprises facilitating servicing a request from the requester within the second cluster of the first drawer prior to servicing a request from a requester in a second drawer.

7. The computer-implemented method of claim 1, wherein the processing device is a shared cache (SC) chip.

8. The computer-implemented method of claim 1, wherein a hot cache line scenario is detected when a fetch with intent to modify (FWITM) is received from a requester in a cluster and a target cache line is not held exclusive by any processor in the cluster.

9. A system for hot cache line arbitration, the system comprising:
    a memory comprising computer readable instructions; and
    a processing device for executing the computer readable instructions for performing a method, the method comprising:
        detecting, by the processing device, a hot cache line scenario;
        tracking, by the processing device, hot cache line requests from requesters to determine subsequent satisfaction of the requests; and
        facilitating, by the processing device, servicing of the hot cache line requests according to a hierarchy of the requestors, the hierarchy of the requestors being based at least in part on a location of the requestors relative to one another.

10. The system of claim 9, wherein each of the requesters is one of a local requestor or a remote requestor.

11. The system of claim 10, wherein facilitating servicing of the hot cache line requests comprises facilitating servicing a request of a local requestor before servicing a request of a remote requestor.

12. The system of claim 10, wherein facilitating servicing of the hot cache line requests comprises facilitating servicing a request of every local requestor before servicing a request of any remote requestor.

13. The system of claim 9, wherein facilitating servicing of the hot cache line requests comprises facilitating servicing a request from a requester within a first requesting cluster of a first drawer before servicing a request from a requester within a second requesting cluster of the first drawer.

14. The system of claim 13, wherein facilitating servicing of the hot cache line requests comprises facilitating servicing a request from the requester within the second cluster of the first drawer prior to servicing a request from a requester in a second drawer.

15. The system of claim 9, wherein the processing device is a shared cache (SC) chip.

16. The system of claim 9, wherein a hot cache line scenario is detected when a fetch with intent to modify (FWITM) is received from a requester in a cluster and a target cache line is not held exclusive by any processor in the cluster.

17. A computer program product for hot cache line arbitration, the computer program product comprising:
    a computer readable storage medium having program instructions embodied therewith, wherein the computer readable storage medium is not a transitory signal per se, the program instructions executable by a processing device to cause the processing device to perform a method comprising:
        detecting, by the processing device, a hot cache line scenario;

tracking, by the processing device, hot cache line requests from requesters to determine subsequent satisfaction of the requests; and facilitating, by the processing device, servicing of the hot cache line requests according to a hierarchy of the requestors, the hierarchy of the requestors being based at least in part on a location of the requestors relative to one another.

18. The computer program product of claim 17, wherein each of the requesters is one of a local requestor or a remote requestor.

19. The computer program product of claim 18, wherein facilitating servicing of the hot cache line requests comprises facilitating servicing a request of a local requestor before servicing a request of a remote requestor.

20. The computer program product of claim 18, wherein facilitating servicing of the hot cache line requests comprises facilitating servicing a request of every local requestor before servicing a request of any remote requestor.

\* \* \* \* \*